United States Patent
Chen

(10) Patent No.: US 10,388,473 B2
(45) Date of Patent: Aug. 20, 2019

(54) UNIT TYPE BACKLIGHT MODULE AND BACKLIGHT KEYBOARD USING THE SAME

(71) Applicant: LITE-ON TECHNOLOGY CORPORATION, Taipei (TW)

(72) Inventor: Chun-Lin Chen, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 16/124,333

(22) Filed: Sep. 7, 2018

(65) Prior Publication Data

US 2019/0088428 A1 Mar. 21, 2019

(30) Foreign Application Priority Data

Sep. 15, 2017 (CN) .......................... 2017 1 0834919

(51) Int. Cl.
*H01H 13/83* (2006.01)
*F21V 8/00* (2006.01)
*H01H 13/705* (2006.01)

(52) U.S. Cl.
CPC ........... *H01H 13/83* (2013.01); *G02B 6/0021* (2013.01); *G02B 6/0075* (2013.01); *H01H 13/705* (2013.01); *H01H 2219/044* (2013.01); *H01H 2219/062* (2013.01); *H01H 2219/064* (2013.01)

(58) Field of Classification Search
CPC ....... H01H 3/83; G02B 6/0021; G02B 6/0075
See application file for complete search history.

(56) References Cited

U.S. PATENT DOCUMENTS

2017/0194116 A1* 7/2017 Sun .................. H01H 13/83

* cited by examiner

*Primary Examiner* — Anne M Hines
(74) *Attorney, Agent, or Firm* — McClure, Qualey & Rodack, LLP

(57) ABSTRACT

A unit type backlight module including a circuit board, a plurality of light emitting units and a plurality of light guide plates is provided. The circuit board is disposed under the key structures. The light emitting units is disposed on the circuit board. The light guide plates are disposed on the circuit board and are separated from each other. The light emitting units and their corresponding light guide plates are disposed under the key structures for each key structure.

11 Claims, 4 Drawing Sheets

UNIT TYPE BACKLIGHT MODULE AND BACKLIGHT KEYBOARD USING THE SAME

This application claims the benefit of People's Republic of China application Serial No. 201710834919.4, filed Sep. 15, 2017, the subject matter of which is incorporated herein by reference.

BACKGROUND OF THE INVENTION

Field of the Invention

The invention relates in general to a backlight keyboard, and more particularly to a unit type backlight module and a backlight keyboard using the same.

Description of the Related Art

More and more keyboards use backlight module to provide the needed backlight effect. Particular, the keyboard of notebook computer requests higher and higher standards of the backlight module. Conventional backlight module uses single light guide plate, and therefore may easily result in light flooding when the light guide plate transfers the light to an area not requiring the backlight or may result in light mixing between two adjacent light emitting units. When the phenomenon of light flowing or light mixing occurs, the quality of the backlight module will be affected.

SUMMARY OF THE INVENTION

The invention is directed to a unit type backlight module and a backlight keyboard using the same capable of providing necessary backlight to each key structure to avoid the light being mixed or flooded.

According to one embodiment of the invention, a unit type backlight module including a circuit board, multiple light emitting units and multiple light guide plates is provided. The circuit board is disposed under the key structures. The light emitting units is disposed on the circuit board. The light guide plates are disposed on the circuit board and are separated from each other. The light emitting units and their corresponding light guide plates are disposed under the key structures separately for each key structure.

According to another embodiment of the invention, a backlight keyboard including a bottom plate, multiple key structures disposed on the bottom plate and a unit type backlight module disposed under the bottom plate is provided.

The above and other aspects of the invention will become better understood with regard to the following detailed description of the preferred but non-limiting embodiment(s). The following description is made with reference to the accompanying drawings.

DETAILED DESCRIPTION OF THE INVENTION

Detailed descriptions of the invention are disclosed below with a number of embodiments. However, the disclosed embodiments are for explanatory and exemplary purposes only, not for limiting the scope of protection of the invention.

Figure 1:
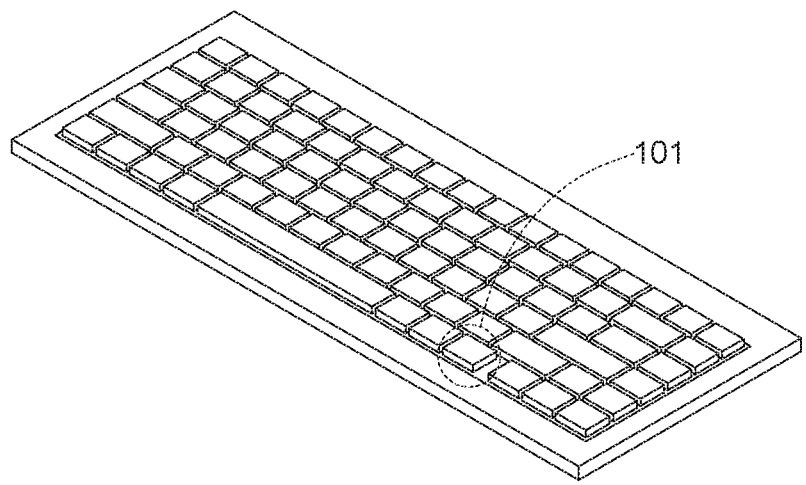
FIG. 1 is a schematic diagram of a backlight keyboard according to an embodiment of the invention.
Figure 2A:
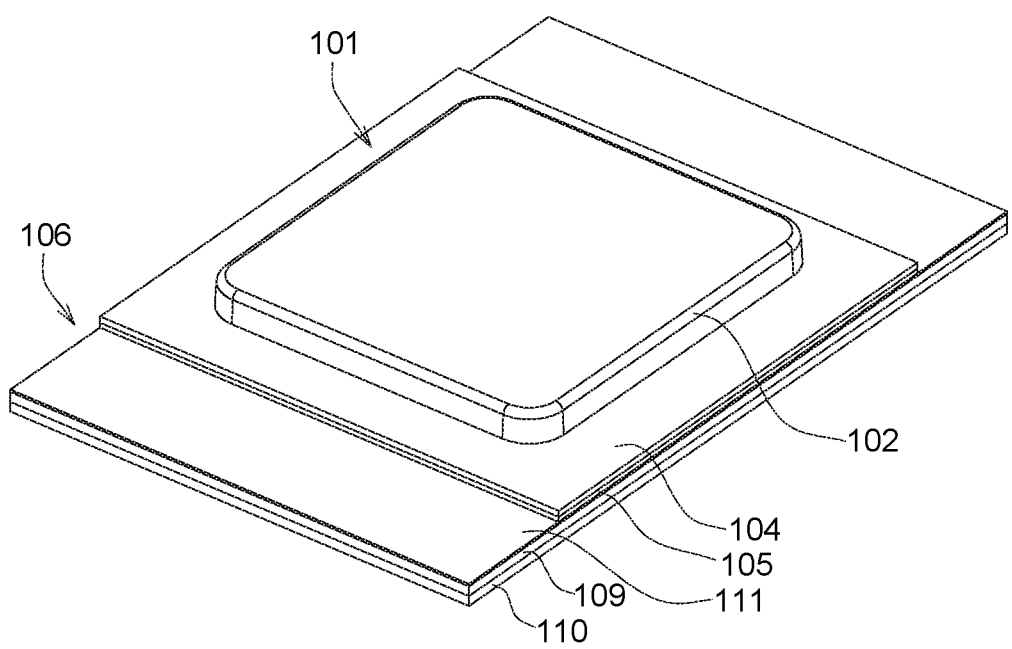
FIGS. 2A and 2B respectively are an assembly diagram of a key structure of the backlight keyboard of FIG. 1 and an explosion diagram of a unit type backlight module correspondingly disposed under the key structure.
Figure 2B:
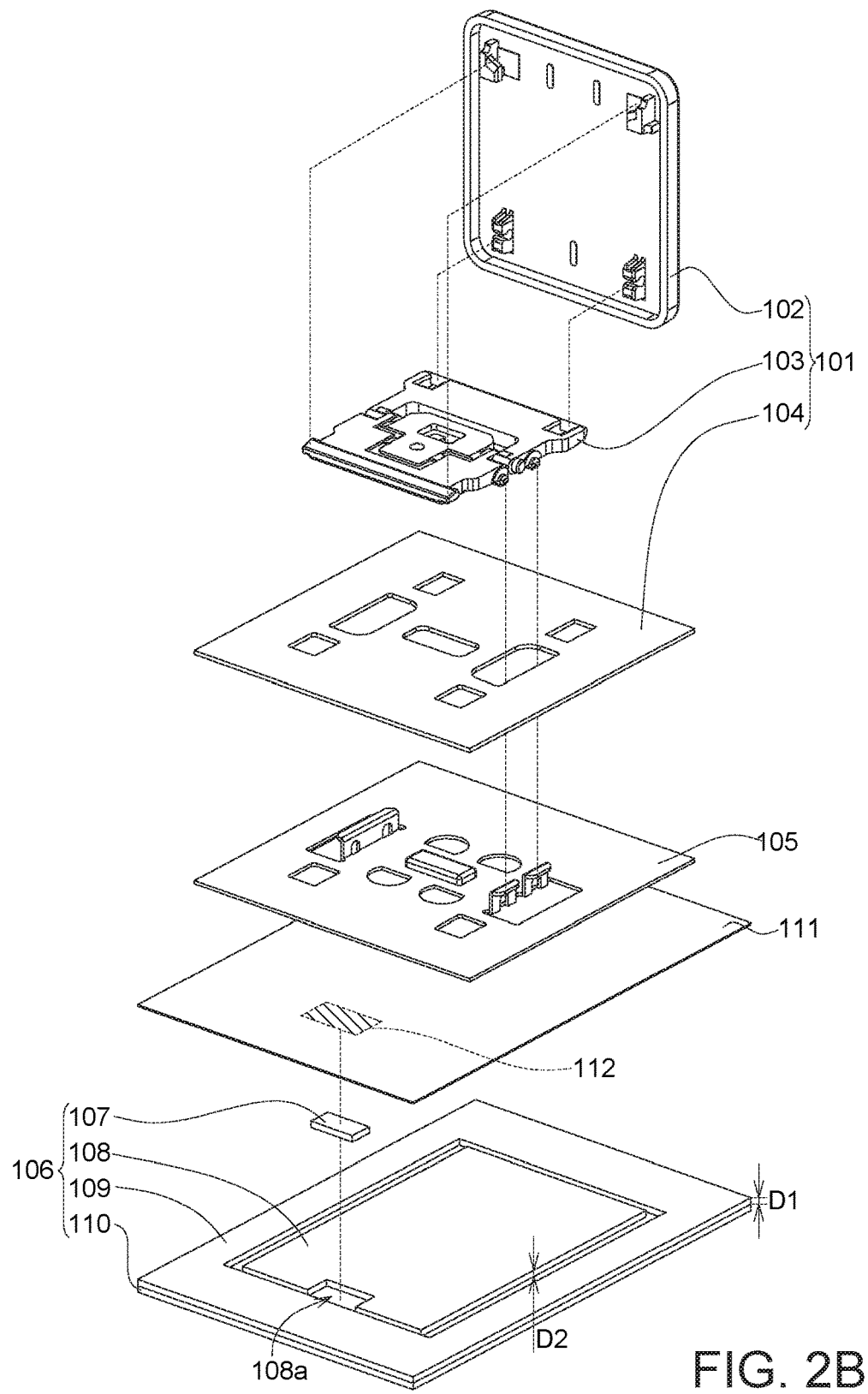

Referring to FIG. 1 and FIGS. 2A-2B. FIG. 1 is a schematic diagram of a backlight keyboard 100 according to an embodiment of the invention. FIGS. 2A and 2B respectively are an assembly diagram of a key structure 101 of the backlight keyboard 100 of FIG. 1 and an explosion diagram of a unit type backlight module 106 correspondingly disposed under the key structure 101. The backlight keyboard 100 includes a bottom plate 105, a plurality of key structures 101 disposed on the bottom plate 105, and a unit type backlight module 106 disposed under the bottom plate 105.

As indicated in FIG. 2B, the key structure 101 is a translucent key which can be realized by one of a scissor type key, a magnetic absorption key and an elastic piece type key. The key structure 101 mainly includes a cap 102, a bracket 103 and a film switch 104. The bracket 103 is movably interposed between the cap 102 and the bottom plate 105. The cap 102 can move upward and downwardly with respect to the bottom plate 105. The film switch 104 is disposed under the cap 102. When the cap 102 moves towards the bottom plate 105, the film switch 104 will be triggered to generate a pressing signal.

As indicated in FIG. 2B, the unit type backlight module 106 includes a circuit board 110 which can be realized by such as a multi-layer circuit substrate or a thin-film circuit flexible board. The unit type backlight module 106 has a light emitting unit 107 and a light guide plate 108 disposed under each key structure 101 of the backlight keyboard 100. That is, the unit type backlight module 106 has a plurality of light emitting units 107 disposed on the circuit board 110 and a plurality of light guide plates 108 disposed on the circuit board 110. The light guide plates 108 are separated from each other, and the light emitting units 107 and their corresponding light guide plates 108 are disposed under the key structures 101 separately for each key structure 101.

In the present embodiment, each light emitting unit 107 and its corresponding light guide plate 108 provide backlight to one single key structure 101 only, hence avoiding the light being mixed or flooded between two adjacent light emitting units 107. Since the brightness of each light emitting unit 107 can be controlled or adjusted to be uniform, the problem of light attenuation, which occurs when the conventional backlight module has poor uniformity or has holes, can thus be avoided.

The light emitting elements of the light emitting units 107 can emit one or more than one color light, and can be realized by at least one type of light emitting diodes including red light emitting diode, green light emitting diode, blue light emitting diode and white light emitting diode. Each light guide plate 108 is made of a transparent material, and the bottom of the light guide plate 108 can have multiple light guide protrusions (not illustrated) for reflecting an incoming light to a corresponding key structure 101 to form the needed backlight, wherein the incoming light, which is generated by the light emitting units 107, enters the light guide plate 108 via a lateral side of the light guide plate 108.

Refer to FIG. 2B. The lateral side of each light guide plate 108 has a recessed portion 108a, and each light emitting unit 107 is disposed in a corresponding recessed portion 108a, such that the light input can be increased and the light loss of the light emitting unit 107 can be reduced. Besides, a light shielding layer 112 can be interposed between the bottom plate 105 and the circuit board 110. After the light shielding layer 112 is formed on a transparent plastic film 111, the transparent plastic film 111 is attached to the underneath of the bottom plate 105, such that the light shielding layer 112 can cover its corresponding light emitting units 107 to reduce the amount of light flood. In an embodiment, the light shielding layer 112 is made of a light-absorbing material and can be realized by a black polyester film (such as polyethylene terephthalate (PET) or a black mylar sheet. In another embodiment, no light shielding layer 112 is disposed on the light emitting units 107, but the bottom plate 105 still can provide a light shielding effect.

Refer to FIG. 2B. To reduce light flood, the circuit board 110 of the unit type backlight module 106 may further include a light shielding unit 109 for isolating each light guide plate 108. The light shielding unit 109 is made of a light-absorbing material or a light-reflecting material. The backlight needed by the single key structure 101 is contained within the space enclosed by the light shielding unit 109, and the area not requiring the backlight is covered by the light shielding unit 109.

In an embodiment, the light shielding unit 109 can be made of an opaque paint material or a coating material. The light shielding unit 109 is formed on the circuit board 110 and encloses the light guide plate 108 to form a hollowed light shielding wall structure. In another embodiment, the light shielding unit 109 is made of a light-absorbing material and can be realized by a black polyester film (such as PET) or a black mylar sheet. The light shielding unit 109 can be attached on the circuit board 110 and encloses the light guide plate 108 to form a hollowed light shielding wall structure.

Refer to FIG. 2B. In an embodiment, each light guide plate 108 has a thickness D2 of 0.33 mm; the light shielding unit 109 has a thickness D1 smaller than or equivalent to 0.33 mm but larger than 0.1 mm. Therefore, the thickness D1 of the light shielding unit 109 is substantially smaller than or equivalent to the thickness D2 of the light guide plate 108. In another embodiment, the thickness D1 of the light shielding unit 109 can be larger than the thickness D2 of the light guide plate 108.

In another embodiment, no light shielding unit 109 is disposed surrounding a light guide plate 108, but the light can hardly enter another light guide plate 108 through the gap because the light guide plates 108 are separated from each other by a gap (such as the air). Therefore, the light mixing still can be avoided.

Figure 3:
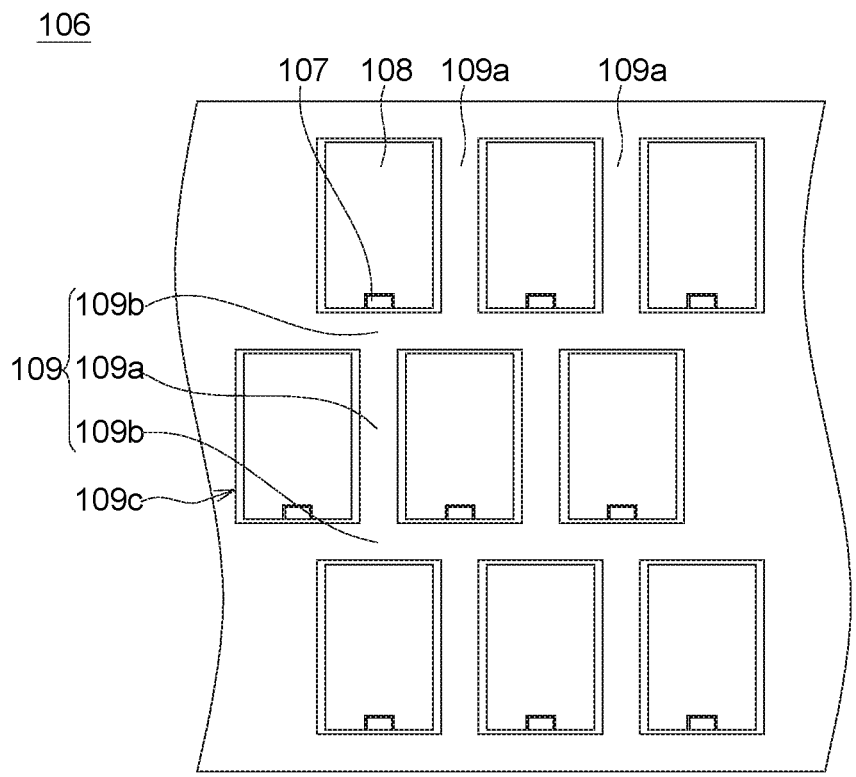
FIG. 3 is a schematic diagram of a light shielding unit of a unit type backlight module.

Referring to FIG. 3, a schematic diagram of a light shielding unit 109 of a unit type backlight module 106 is shown. In an embodiment, the light shielding unit 109 has a plurality of staggered grids 109a and 109b and multiple openings 109c defined by the grids 109a and 109b (such as enclosed openings). The grids 109a and 109b are located at an area not requiring the backlight, and the openings 109c are located under the key structure 101 and can be configured in the unit type backlight module 106. Therefore, when the light emitting unit 107 and its corresponding light guide plate 108 are respectively located in the openings 109c, the unit type backlight module 106 can provide a backlight needed by each key structure 101 to avoid the light being mixed or flooded.

Figure 4:
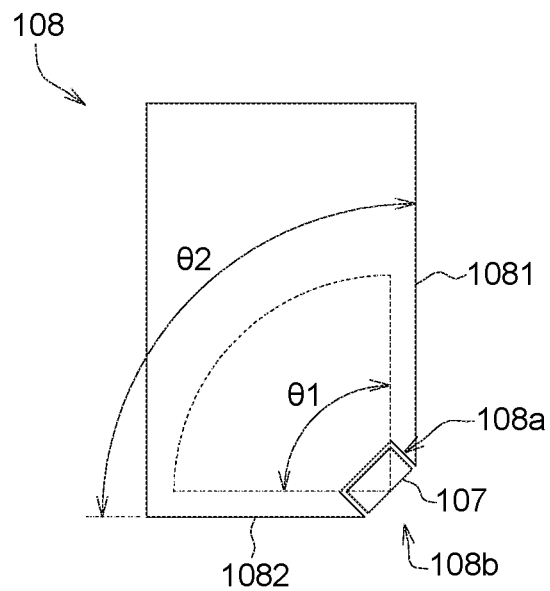
FIG. 4 is a configuration diagram of a light emitting unit according to another embodiment of the invention.

Refer to FIGS. 2B and 4. FIG. 4 is a configuration diagram of a light emitting unit 107 according to another embodiment of the invention. In FIG. 4, the light emitting unit 107 is not located in the middle of the light guide plate 108 as indicated in FIG. 2B but is located corresponding to a corner 108b of the light guide plate 108, wherein the light guide plate 108 is such as a quadrilateral and has a first lateral side 1081 and a second lateral side 1082 with respect to the corner 108b. Furthermore, the light emitting unit 107 has a light output angle θ1 equivalent to 90° or larger than 90°, and an angle θ2 of 90° formed between the first lateral side 1081 and the second lateral side 1082, but the invention is not limited thereto. The configuration of the angles in FIG. 4 is very different that in FIG. 2B. When the light emitting unit 107 is disposed at the corner 108b, the light output angle θ1 of the light emitting units 107 is larger than or equivalent to the angle θ2 between the first lateral side 1081 and the second lateral side 1082. Therefore the light generated by the light emitting unit 107 can be uniformly transferred to each corner of the light guide plate 108, and the light output is more uniform.

Figure 5:
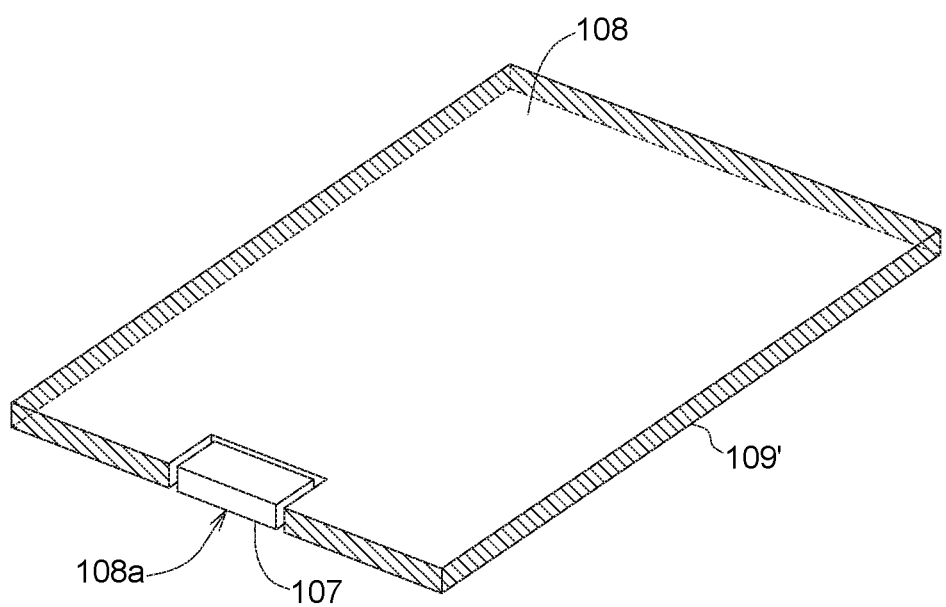
FIG. 5 is a configuration diagram of a light shielding unit according to another embodiment of the invention.

Refer to FIGS. 2B and 5. FIG. 5 is a configuration diagram of a light shielding unit 109' according to another embodiment of the invention. In FIG. 5, the light shielding unit 109' is not disposed on the circuit board 110 but is disposed on a lateral side of each light guide plate 108. Except for the part of the lateral side where a recessed portion 108a is formed for receiving the light emitting unit 107, the remaining part of the lateral side can be covered by the light shielding unit 109' to form a light shielding wall structure similar to that of FIG. 2B to avoid the light being mixed or flooded. The light shielding unit 109' can be made of a light-absorbing material or a light-reflecting material. The light-absorbing material is such as a black opaque material, and the light-reflecting material is such as a metal material with high reflectivity, but the invention is not limited thereto.

While the invention has been described by way of example and in terms of the preferred embodiment(s), it is to be understood that the invention is not limited thereto. On the contrary, it is intended to cover various modification and similar arrangements and procedures, and the scope of the appended claims therefore should be accorded the broadest interpretation so as to encompass all such modification and similar arrangements and procedures.

What is claimed is:

1. A unit type backlight module used in a keyboard having a plurality of key structure, wherein the unit type backlight module comprises:
    a circuit board disposed under the key structures;
    a plurality of light emitting units disposed on the circuit board;
    a plurality of light guide plates disposed on the circuit board and separated from each other, wherein the light emitting units and corresponding light guide plates are disposed under the key structures separately; and
    a light shielding layer correspondingly covering the light emitting units, wherein the light shielding layer is formed of a black polyester film.

2. The unit type backlight module according to claim 1, further comprising:
    a light shielding unit disposed on the circuit board for isolating between the light guide plates.

3. The unit type backlight module according to claim 2, wherein the light shielding unit has a plurality of grids and a plurality of openings defined by the grids, and the light emitting units and the corresponding light guide plates are respectively located in the openings.

4. The unit type backlight module according to claim 2, wherein the light shielding unit is made of a light-absorbing material or a light-reflecting material.

5. The unit type backlight module according to claim 2, wherein the light shielding unit is made of an opaque paint material or a coating material and is formed on the circuit board.

6. The unit type backlight module according to claim 2, wherein the light shielding unit is a black polyester film disposed on the circuit board.

7. The unit type backlight module according to claim 1, further comprising:
a light shielding unit disposed on a lateral side of each of the light guide plates, wherein the light shielding unit is made of a light-absorbing material or a light-reflecting material.

8. The unit type backlight module according to claim 1, wherein a recessed portion is formed on a lateral side of each of the light guide plates, and each of the light emitting units is disposed in a corresponding recessed portion.

9. The unit type backlight module according to claim 1, wherein each of the light guide plates has a first lateral side and a second lateral side with respect to a corner, and each of the light emitting units is disposed in a corresponding corner.

10. The unit type backlight module according to claim 9, wherein each of the light emitting units has a light output angle, an angle is formed between the first lateral side and the second lateral side, and the light output angle is substantially larger than or equivalent to the angle.

11. A backlight keyboard, comprising:
a bottom plate;
a plurality of key structures disposed on the bottom plate; and
the unit type backlight module according to claim 1 disposed under the bottom plate.

* * * * *